United States Patent
Zuser et al.

(10) Patent No.: US 6,200,663 B1
(45) Date of Patent: Mar. 13, 2001

(54) ROUGH SURFACE PACKAGING ELEMENT

(75) Inventors: Wilhelm Zuser, St.Pölten; Lambert Nekula, Hofstetten; Franz Reiterer, Neustift-Innermanzing, all of (AT)

(73) Assignee: Teich Aktiengesellschaft, Obergrafendorf (AT)

( * ) Notice: Subject to any disclaimer, the term of this patent is extended or adjusted under 35 U.S.C. 154(b) by 0 days.

(21) Appl. No.: 09/125,040

(22) PCT Filed: May 7, 1997

(86) PCT No.: PCT/AT97/00091

§ 371 Date: Aug. 12, 1998

§ 102(e) Date: Aug. 12, 1998

(87) PCT Pub. No.: WO98/26931

PCT Pub. Date: Jun. 25, 1998

(30) Foreign Application Priority Data

Dec. 17, 1996 (AT) .................................... 2200/96

(51) Int. Cl.[7] ..................................... B32B 3/26
(52) U.S. Cl. .................. 428/156; 428/457; 428/141; 428/195; 428/213; 428/220; 229/125.01; 220/359.1; 220/359.3; 220/380
(58) Field of Search ................... 428/141, 156, 428/195, 457, 213, 220; 229/125.01; 220/359.1, 359.3, 380

(56) References Cited

U.S. PATENT DOCUMENTS

| Re. 33,880 | 4/1992 | Yamazaki et al. | 383/200 |
|---|---|---|---|
| 4,477,502 | 10/1984 | O'Sullivan | 428/35 |
| 4,478,663 | 10/1984 | O'Sullivan | 156/203 |
| 4,960,637 | 10/1990 | Biczenczuk | 428/314.4 |
| 5,227,233 * | 7/1993 | Itaba et al. | 428/354 |
| 5,254,302 * | 10/1993 | Yamanaka | 264/129 |
| 5,342,684 * | 8/1994 | Carespodi | 428/347 |
| 5,364,704 | 11/1994 | Murschall et al. | 428/516 |
| 5,512,337 | 4/1996 | Littmann et al. | 428/35.4 |
| 5,516,563 | 5/1996 | Schumann et al. | 428/34.2 |

FOREIGN PATENT DOCUMENTS

| 0 089 746 A2 | 9/1983 | (EP) . |
|---|---|---|
| 0 472 923 A2 | 3/1992 | (EP) . |
| 0 514 803 A1 | 11/1992 | (EP) . |
| 2 500 019 | 8/1992 | (FR) . |

OTHER PUBLICATIONS

Observations of a Third Party, Mar. 27, 2000.
Observations of a Third Party dated May 9, 2000 including Declaration of John Kingston and Exhibits A–F.
*Taschenbuch der Kunststoff–Additive,* Dr. R. Gachter et al., Stabilisatoren, Hilfstoffe, Weichmacher, Fullstoffe, Verstarkungsmittel, Farbmittel.
Database WPI, Section Ch, Week 7940. Derwent Publications Ltd., London, GB; Class A32, AN 79–72940B XP002054747 & JP 54 027 034B (Toyobo KK), Sep. 7, 1979.
Database WPI, Section Ch, Week 9519. Derwent Publications Ltd., London, GB; Class A35, AN 95–144313 XP002054748 & JP 07 068 692 A (Toyobo KK), Mar. 14, 1995.

(List continued on next page.)

*Primary Examiner*—William P. Watkins, III
(74) *Attorney, Agent, or Firm*—Bacon & Thomas

(57) ABSTRACT

The present invention pertains to a packaging element comprising a supporting material fitted, on its face turned opposite the package, with a layer presenting a marking area and, on its face turned to the package, with a rough surface coating. The coating roughness has a depth of 1 to 100 μm, which can be obtained by using granulous filling material. The rough surface packaging element is suited as a covering element, including for yoghurt, as well as in the production of labels for bottle finishes.

7 Claims, 2 Drawing Sheets

OTHER PUBLICATIONS

Figure 3:
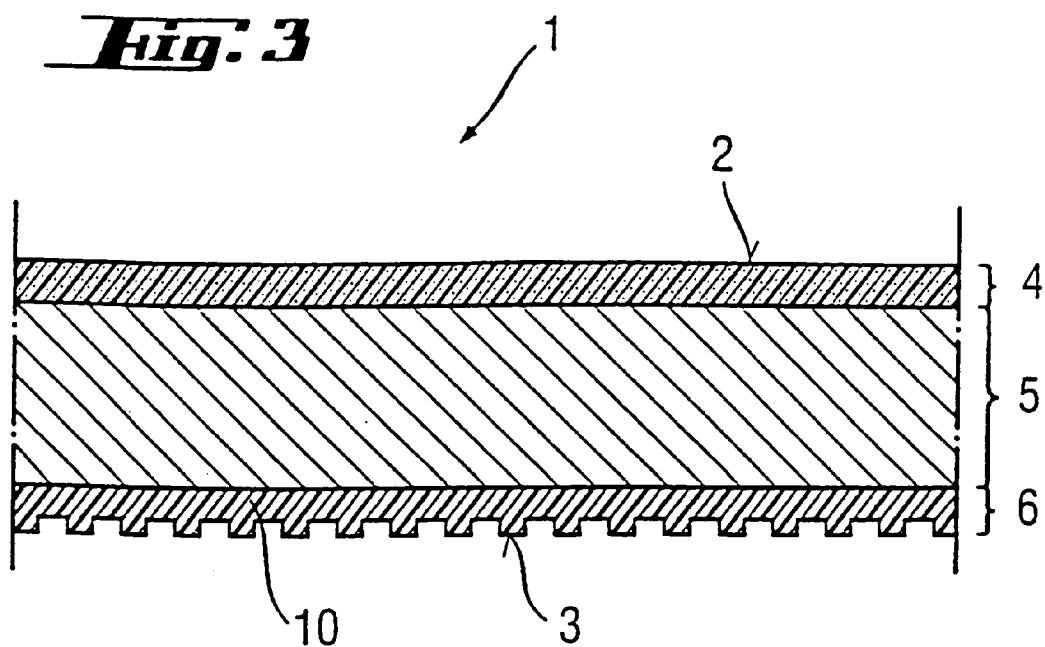

Database WPI, Section Ch, Week 9631. Derwent Publications Ltd., London, GB; Class A28, AN 96–306853 XP002054749 & JP 08 134 409 A (Oji Kako KK), May 28, 1996.

Database WPI, Section Ch, Week 9425. Derwent Publications Ltd., London, GB; Class A92, AN 94–205856 XP00205450 & JP 06 143 518 A(Mitsubishi Petrochemica Co Ltd), May 24, 1994.

* cited by examiner

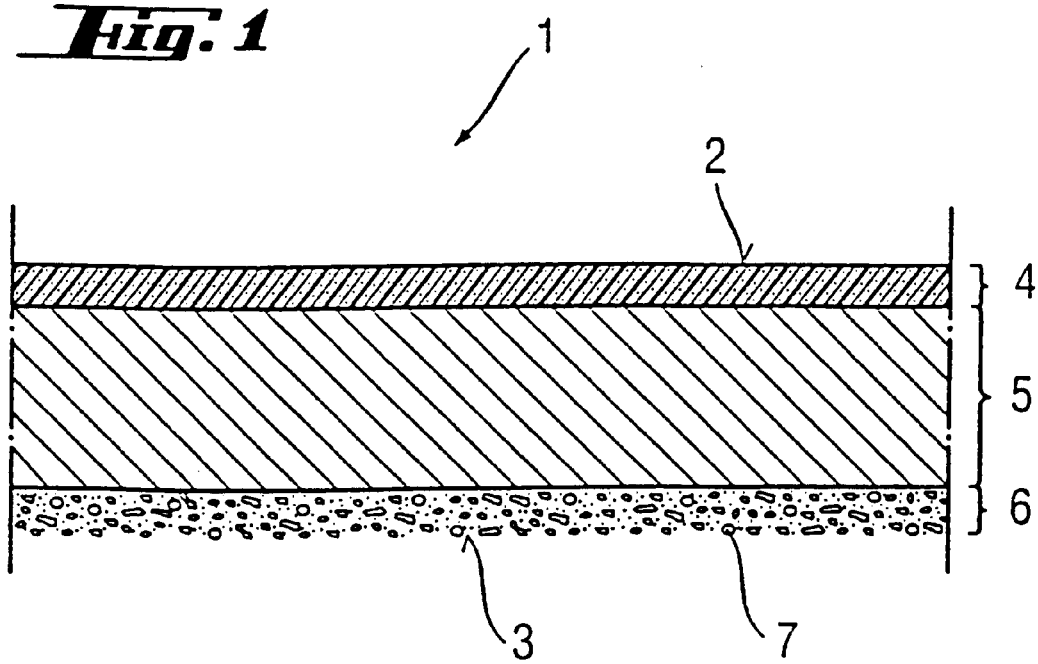
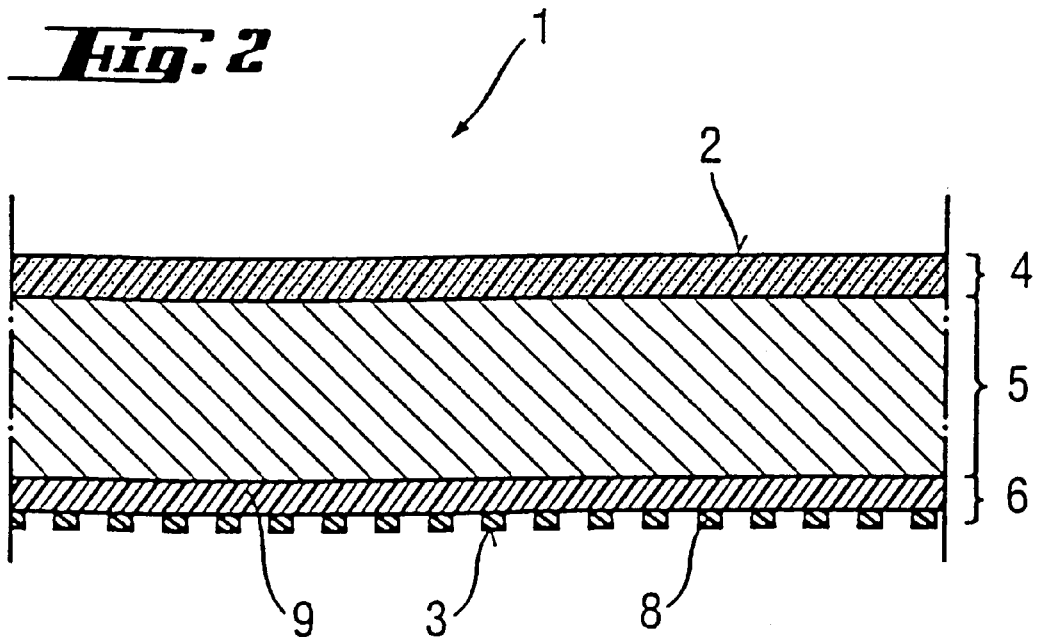

ROUGH SURFACE PACKAGING ELEMENT

BACKGROUND OF THE INVENTION

1. Field of the Invention

The invention relates to a packaging element comprised of a carrier material that is provided with a layer that carries a printed image on the side facing away from the material to be packaged, and with a coating on the side that is turned toward the material to be packaged.

2. Description of Related Art

Packaging elements of the type mentioned at the outset are used, for example, as lids for yogurt cups or as labels for the necks of bottles. In order to identify the goods, printing is applied to the packaging elements on the side facing away from the material to be packaged. Furthermore, it is known how to apply a coating in the form of a hot sealing lacquer to the side that is turned toward the goods to be packaged, for example, in the production of yogurt lids. By the application of this hot sealing lacquer, an airtight connection is formed between the yogurt cup and the lid that is capable, at the same time, of being peeled apart.

In order to manufacture these packaging elements, the carrier material, aluminum, for example, is used in the form of rolled foils, which are continually supplied with a layer of hot sealing lacquer on the side that is turned toward the material to be packaged, and with a layer that carries a printed image on the side that is turned away from the material to be packaged. In order to adapt the packaging elements to the form of the material to be packaged, appropriately shaped stamping tools are used. After the stamping process, a stack of packaging elements, such as yogurt lids, results. Due to the fact that the latter exhibit a smooth surface on both sides, problems arise in the course of removing the individual elements from stacks. The yogurt lids adhere to one another so strongly that in some instances, two or more lids are removed from the stack simultaneously.

In order to eliminate this undesired effect, the film composite has been subjected to an embossing step prior to the stamping process. By so doing, superficially rough films are produced that can be readily removed from a stack because, due to the air that is trapped between the embossed ridges, adhesion of the films to one another is prevented. The embossing process, however, has the disadvantage that the printed image is distorted, or even destroyed.

It is now the task of the invention to avoid this well-known disadvantage, while at the same time providing packaging elements that are easy to manipulate.

SUMMARY OF THE INVENTION

According to the invention, therefore, a packaging element of the type mentioned at the outset is proposed, which is characterized by the fact that the side of the packaging element that is turned toward the material to be packaged has a superficially rough coating with a depth of roughness measuring 1–100 $\mu$m.

A further advantage of the invention is that the coating is present in the form of a superficially rough imprint such that the latter is advantageously formed by means of geometrically arranged spacers.

The geometrically arranged spacers are provided on the side that is turned away from the material to be packaged, and/or on the side turned toward it; advantageously, they have a height of 1–100 $\mu$m, and preferably of 4–15 $\mu$m.

The depth of roughness of the superficially roughened coating is advantageously produced by the addition of a granular material.

The carrier material of the packaging element according to the invention advantageously consists of aluminum, paper, or plastic, where in the case of plastic, preferably one that is based upon polypropylene, polyethylene, polyamide, or polyethylene terephthalate is used. Furthermore, film composites having the following combination of materials, beginning with the goods to be packaged, can be advantageously used as carrier material: aluminum/aluminum, aluminum/plastic, plastic/aluminum, plastic/plastic, aluminum/paper, paper/aluminum, paper/paper.

Furthermore, the use of the packaging element according to the invention to produce lids for cups is proposed such that the superficially rough coating is also capable of being sealed.

A further advantage when using the packaging element according to the invention for the production of lids for cups consists of the fact that between the carrier material and the sealable superficially rough coating, an additional sealable coating is provided, the surface roughness of which is equal to 0 or nearly equal to 0.

The packaging element can also be used, according to the invention, for the production of labels for the necks of bottles.

DETAILED DESCRIPTION OF THE PREFERRED EMBODIMENT

The invention will now be elucidated in greater detail by the use of FIGS. 1–4.

FIGS. 1–4 show the packaging element according to the invention 1, which is comprised of the carrier material 5 on which, on the side 2 that is turned away from the material to be packaged, a layer 4 that carries a printed image is provided. On the side 3 that is turned toward the material to be packaged, the superficially rough coating 6 is provided.

In the case of the layer 4 that carries the printed image, the thickness of the layer is a maximum of 30 $\mu$m, and in the case of the superficially rough coating 6 that lies on the side that is turned toward the material to be packaged, it is a maximum of 120 $\mu$m.

The thickness of the layer of the carrier material 5 is 5–200 $\mu$m; in the event that aluminum is used as the carrier material, the thickness of the layer lies within a range of 10–70 $\mu$m; in the case of paper, it lies within a range of 20–150 $\mu$m; and in the case of plastic, it lies within a range of 7–150 $\mu$m.

If the packaging element according to the invention is used, for example, as a cover element for yogurt cups, the carrier material advantageously consists of aluminum with a tensile strength of 60–250 N/mm$^2$.

The layer 4 that carries the printed image is produced in such a manner that, in a way that is known per se, a primer lacquer (not shown) is applied to the carrier material 5 prior to printing in order to assure sufficient adhesion between the printing and the carrier material. Now, a printed image is produced upon the carrier material that has been coated with the primer lacquer prior to printing by means of the intaglio printing process or the flexographic printing process, for example. In order to protect the printed image, the latter is then provided with an overlay lacquer that is capable of slipping.

On the side that is turned toward the material to be packaged, the carrier material 5 is equipped with a coating 6 that has a rough surface.

According to FIG. 1, the surface roughness of the coating 6 is produced by the use of granular fillers 7. Due to the fact that these granular fillers accumulate on the side 3 that is turned toward the material to be packaged, a surface roughness of at least 1 µm is produced. In addition, because of these relatively low values of surface roughness, the process of removal from the stack can be facilitated with the process depicted at the outset. The packaging element according to the invention 1 that is depicted according to FIG. 2 has on the side 3 that is turned toward the material to be packaged a superficially rough coating 6, which has a coating 9 with a surface roughness of 0 or nearly equal to 0. With the aid of an appropriately shaped pressure roll, an additional coating is applied to this coating so that the spacers 8 are formed in geometrical arrangement on the side 3 of the surface that is turned toward the material to be packaged. In the process, the surface of the pressure roll exhibits depressions, for example, that correspond to the geometric arrangement as well as the shape of the spacers. The coating that is used to produce the spacers 8 can in addition carry granular fillers.

FIG. 3 also shows a superficially rough coating 6, which carries the spacers 10 in geometrical arrangement. This packaging element according to FIG. 3 can be produced in a process that is particularly easy to implement, due to the fact that with the aid of an appropriately shaped pressure roll, a coating is applied directly onto carrier material 5 so that the spacers 10 are produced.

The pressure roll is formed in such a way that coating thicknesses of 1–30 µm are possible, and owing to corresponding depressions in the surface of the press roller, coating thicknesses of 4–100 µm are possible at geometrically arranged locations.

Figure 4:
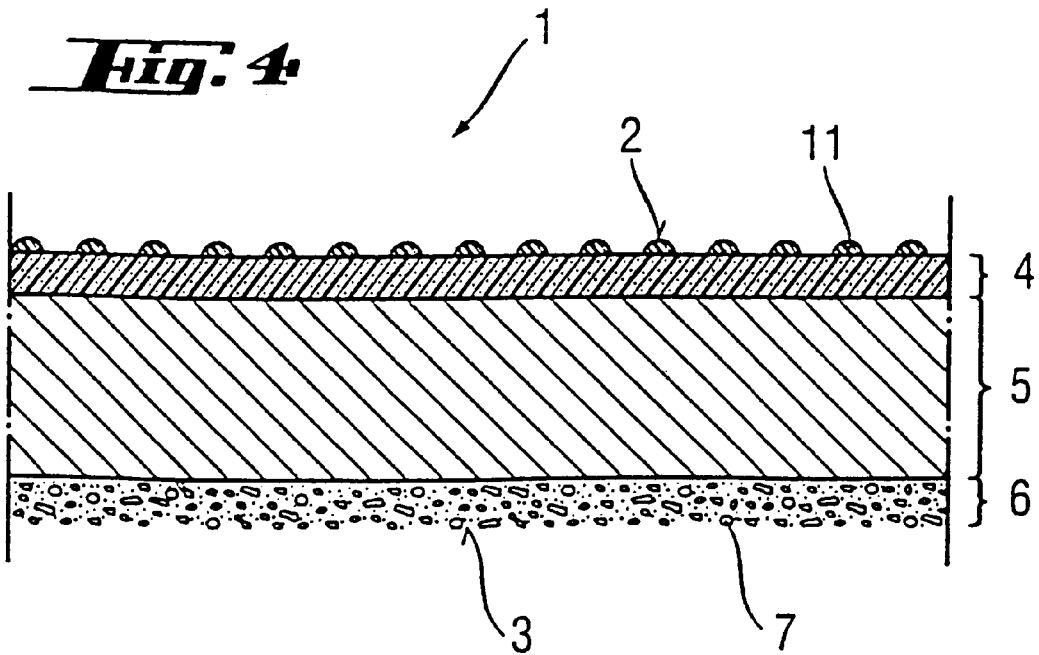

The packaging element according to the invention that is shown according to FIG. 4 also carries spacers 11 on the side of the surface 2 that is turned away from the material being packaged. These spacers 11 are produced on the layer 4 that carries the printed image in such a manner that with the aid of an appropriately shaped pressure roll, a layer of printing ink is applied so that the spacers 11 are produced, for example, in semicircular form. Due to the geometrical arrangement of the spacers 11, an additional decorative effect can be produced, over and above the printed image. The coating 6 that is turned toward the material to be packaged can carry granular filler material 7, analogously to the representation according to FIG. 1. It is also possible, however, to provide the superficially rough coating 6 according to FIGS. 2 or 3.

The packaging element according to the invention lends itself particularly well as a cover element for yogurt cups. In the case of this use, it is necessary in addition to provide the superficially rough coating in the form of a sealable layer, so that an airtight connection, but at the same time one that can be peeled, is created between the cover and the yogurt cup.

Furthermore, the packaging element according to the invention, especially the one that is represented in FIG. 1, lends itself to the production of labels for the necks of bottles. In the case of this use, the superficially rough coating must be particularly compatible with the adhesives that are used in conjunction with the application of labels to the necks of bottles.

What is claimed is:

1. A cup lid comprising an aluminum containing carrier material that is provided with a layer that carries a printed image on the side that is turned away from the material to be packaged, and with a superficially rough coating having a roughness depth of 1–100 µm on the side that is turned toward the material to be packaged, wherein the superficially rough coating is present in the form of a superficially rough imprint having the form of geometrically arranged spacers and wherein the superficially rough coating is also sealable.

2. A cup lid according to claim 1, wherein the geometrically arranged spacers are even provided on the side turned away from the material to be packaged.

3. A cup lid according to claim 1, wherein the spacers have a height of 4–15 µm.

4. A cup lid according to claim 1, wherein the superficially rough coating additionally consists of a granular material.

5. A cup lid according to claim 1, wherein the aluminum containing carrier material consists of film composites selected from the group consisting of, beginning with the material being packaged: aluminum/aluminum, aluminum/plastic, plastic/aluminum, aluminum/paper and paper/aluminum.

6. A cup lid according to claim 5, wherein the plastic of the film composite is selected from the group consisting of polypropylene, polyethylene, polyamide and polyethylene terephalate.

7. A cup lid according to claim 1, wherein an additional sealable coating whose surface roughness is equal to 0 or nearly equal to 0 is provided between the carrier material and the sealable superficially rough coating.

* * * * *